United States Patent Office 3,094,406
Patented June 18, 1963

3,094,406
OXIME AND HYDROXAMIC ACID DERIVATIVES
OF PHOSPHOROTHIOIC ACIDS
Glenn R. Price, South Chicago Heights, and Edward N. Walsh, Chicago Heights, Ill., and James T. Hallett, Saratoga, Calif., assignors to Stauffer Chemical Company, New York, N.Y., a corporation of Delaware
No Drawing. Filed Oct. 2, 1961, Ser. No. 141,971
17 Claims. (Cl. 71—2.3)

The present invention is directed to a new group of phosphorus containing compounds, their method of preparation, and use as plant growth regulators and pesticides.

In particular, the new compounds are the oxime and hydroxamic acid derivatives of phosphoromonothioic and phosphorodithioic acids. These compounds have been found to be effective in controlling mites, lepidoptera, fungi, and insects of various common orders, as well as regulating the activity and growth of plants.

The new compounds may be represented by the following formula:

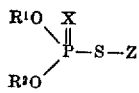

wherein $R^1$ and $R^2$ are the same or different alkyl radicals, X is either oxygen or sulfur, and Z is an oximino or oxamino radical.

The oximino radicals represented by Z have the general structure —O—N=C< in which the two available bonds of the carbon may be connected to hydrogen and various aliphatic and aromatic substituents; the hydroxyl hydrogen originally present having been removed to provide for linkage through the oxygen to the thio sulfur contained in the phosphoro ester portion of the molecule. Among the aliphatic and aromatic substituents for the carbon are cyclics in which the carbon is intramolecularly connected, e.g., in a cycloalkyl or heterocyclic, to a single group. The carbon may also be connected to two of the same or different substituents selected from hydrogen and the alkyl, aryl, alkaryl, aralkyl, alkoxyalkyl, alkoxyaryl, and heterocyclic radicals or the halo and/or nitro substituted derivatives of these radicals. Another suitable oximino radical has the carbon substituted with at least one group of the formula

—$R^5$—O—S—P(Y)(OR$^3$)(OR$^4$)

wherein $R^3$ and $R^4$ are the same or different alkyl, Y is oxygen or sulfur, and $R^5$ is a lower alkylene, phenylene, or naphthalene.

Specific illustrative examples of compounds of the present invention comprising preferred oximino radicals include: O-(O,O-diethylphosphorothio)-cyclohexylketoxime; O-(O,O-diethylphosphorothio)-2,4 - dimethylphenyl methyl ketoxime; O,O'-bis(O,O-diethylphosphorothio)-p-hydroxybenzaldoxime; O-(O,O-dioctylphosphorothio)-methyl ethyl ketoxime; O-(O,O-dioctylphosphorothio)-benzaldoxime; O-(O,O-dioctylphosphorothio)-benzophenone oxime; and O-(O,O-diethylphosphorothio)-p-chlorophenyl methyl ketoxime.

The oxamino radicals represented by Z have the general structure

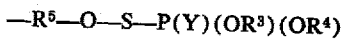

in which the available bond on the carbon may be connected to a substituent selected from hydrogen and the alkyl, aryl, alkaryl, aralkyl, alkoxyalkyl, alkoxyaryl, and heterocyclic radicals or the halo and/or nitro substituted derivatives of these radicals. As with the oximino radicals the hydroxyl hydrogen originally present has been removed to provide for linkage through the oxygen to the phosphorus containing portion of the molecule. Some specific examples of compounds of the invention which comprise the oxamino radical include: O-(O,O-diethylphosphorothio) - benzenehydroxamate; O - (O,O-dimethylphosphorothio-benzenehydroxamate; O - (O,O-diethylphosphorothio) - 2 - chloro-4 - nitrobenzenehydroxamate; and O-(O,O-diethylphosphorothio)-p-methoxy-benzenehydroxamate.

Among the alkyl radicals suitable for the phosphoro ester portions of the molecule, the groups represented by $R^1$, $R^2$, $R^3$, and $R^4$, are methyl, ethyl, propyl, butyl, amyl, octyl, decyl, etc., as well as combinations resulting in mixed esters such as methyl ethyl, ethyl octyl, and the like.

The compounds of the invention may be prepared according to the following general equation:

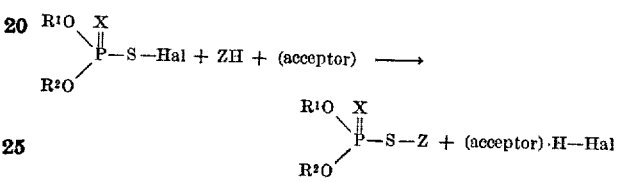

wherein Hal stands for halogen, preferably chlorine, "acceptor" stands for a hydrogen halide acceptor such as the tertiary amines and the like, and $R^1$, $R^2$, X, and Z are as defined above.

Reaction is preferably carried out in the presence of a hydrogen halide acceptor and a nonaqueous organic solvent to prevent possible side reactions between the product material and the halogen acid or the phosphorosulfenyl halide and water. However, the acceptor and nonaqueous medium are not strictly essential to the process, and may be excluded, especially with the less reactive phosphorosulfenyl halides and products, if desired. Most of the reactions are mildly exothermic and may be cooled slightly. Reaction temperatures above about 100° C. will often cause appreciable decomposition of the reactants, while at temperatures below about —100° C. reaction usually proceeds at a negligibly slow rate. By a preferred method of the invention substantially stoichiometric amounts of O,O-dialkylphosphorosulfenyl halide and the selected oxime or hydroxamic acid are slowly mixed in an organic solvent containing a tertiary amine while maintaining the reaction temperature within the range of from —100° C. to 100° C. After complete reaction, the crude mixture is filtered and the solvent removed under vacuum.

The following examples illustrate specific compounds prepared by the method of the present invention:

EXAMPLE 1

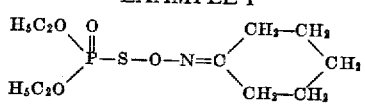

In a flask was placed 22.6 grams (0.2 mole) of cyclohexanone oxime and 20.2 grams (0.2 mole) of triethylamine in 200 ml. of ether. The solution was cooled to 20° C. and 41.0 grams (0.2 mole) of O,O-diethylphosphorosulfenyl chloride was added over a 30 minute period. The reaction mixture was stirred for one additional hour at room temperature, filtered, and concentrated to 50° C. at 2.5 mm. of Hg to yield 46.0 grams (99% yield) of O - (O,O - diethylphosphorothio) - cyclohexanone oxime, $N_D^{25}$=1.4933 analyzing as 10.8% P and 10.7% S as compared to 11.0% P and 11.3% S theoretical.

EXAMPLE 2

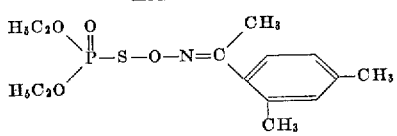

In a flask was placed 16.3 grams (0.10 mole) of 2,4-dimethylphenyl methyl ketoxime and 11.1 grams (0.11 mole) of triethylamine in 150 ml. of ether. The mixture was held between 10° C. and 20° C. and 20.4 grams (0.10 mole) of O,O-diethylphosphorosulfenyl chloride was added over a 30 minute period. The reaction mixture was allowed to stir for 30 additional minutes at room temperature, filtered, and the solvent removed under partial pressure. After concentrating to 55° C. at 1.0 mm. of Hg, 32 grams (96.6% yield) of O-(O,O-diethylphosphorothio)-2,4-dimethylphenyl methyl ketoxime was obtained analyzing as 9.2% P and 10.2% S as compared to 9.35% P and 9.7% S theoretical.

EXAMPLE 3

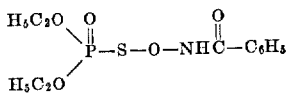

In a flask was placed 20.5 grams (0.15 mole) of benzohydroxamic acid and 16.2 grams (0.16 mole) of triethylamine in 150 ml. of ether. The reaction mixture was held at 10–20° C. and 30.4 grams (0.15 mole) of O,O-diethylphosphorosulfenyl chloride was added over a 30 minute period. The reaction mixture was stirred for two additional hours after the addition was complete, filtered, and the solvent removed under partial pressure. The oily residue was concentrated to 50° C. at 1.5 mm. of Hg to yield 45.0 grams (97.5% yield) of O-(O,O-diethylphosphorothio)-benzenehydroxamate analyzing as 10.1% P as compared to 9.85% P theoretical.

EXAMPLE 4

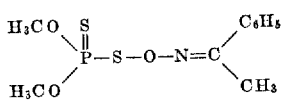

In a flask was placed 13.5 grams (0.10 mole) of acetophenone oxime and 19.3 grams (0.10 mole) of O,O-dimethylphosphorothionosulfenyl chloride. The reaction mixture was held at 0° C. and 11.2 grams (0.11 mole) of triethylamine was added over a 30 minute period. The reaction mixture was allowed to gradually warm up to room temperature over a one hour period, then filtered and the solvent removed under partial pressure. After concentrating to 50° C. at 1.0 mm. of Hg was obtained 36.2 grams (100%) of O-(O,O-dimethylphosphorodithio)-acetophenone oxime analyzing as 10.2% P and 19.9% S as compared to 10.55% P and 21.95% S theoretical.

EXAMPLE 5

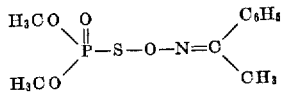

In a flask was placed 20.2 grams (0.15 mole) of acetophenone oxime and 26.5 grams (0.15 mole) of O,O-dimethylphosphorosulfenyl chloride in 150 ml. of ether. The solution was cooled to 10° C. and 16.2 grams (0.16 mole) of triethylamine was added over a 60 minute period. The reaction mixture was stirred an additional hour, filtered, and concentrated to 50° C. at 2.0 mm. of Hg to yield 40.0 grams (97% yield) of O-(O,O-dimethylphosphorothio)-acetophenone oxime, $N_D^{25}=1.5248$ analyzing as 10.7% P and 11.0% S as compared to 11.25% P and 11.55% S theoretical.

EXAMPLE 6

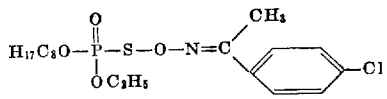

In a flask was placed 16.9 grams (0.10 mole of p-chlorophenyl methyl ketoxime and 28.8 grams (0.10 mole) of O-ethyl-O-octylphosphorosulfenyl chloride in 150 ml. of ether. The reaction mixture was held at 20° C. and 11.2 grams (0.11 mole) of triethylamine was added over a 30 minute period. The reaction mixture was stirred for 90 more minutes at room temperature, filtered, and the solvent removed under partial pressure. The oily product was concentrated to 50° C. at 0.5 mm. of Hg to yield 43.0 grams (100%) of O-(O-ethyl-O-octylphosphorothio)-p-chlorophenyl methyl ketoxime analyzing as 7.7% P and 7.4% S as compared to 7.4% P and 7.6% S theoretical.

Using a procedure substantially in accordance with one or more of those set forth in the preceding examples, the following specific compounds were prepared:

EXAMPLE 7

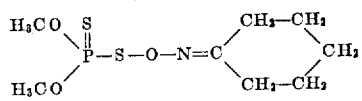

Percent P=9.7 (11.5 theory); percent S=19.7 (23.8 theory)

EXAMPLE 8

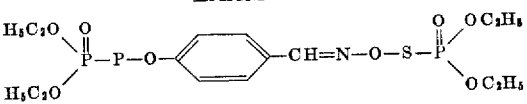

$N_D^{25}=1.4925$; yield=98.0%

EXAMPLE 9

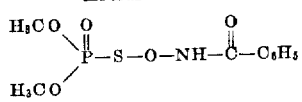

Percent P=10.9 (11.2 theory); percent S=11.0 (11.5 theory)

EXAMPLE 10

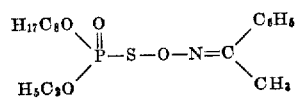

$N_D^{25}=1.5066$; percent P=8.1 (8.0 theory); percent S=9.4 (8.3 theory)

EXAMPLE 11

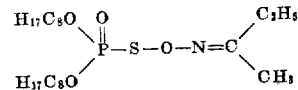

Percent P=7.2 (6.3 theory); percent S=5.9 (6.9 theory)

EXAMPLE 12

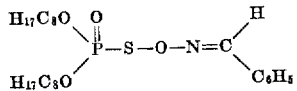

$N_D^{25}=1.4874$; percent P=7.2 (6.8 theory); percent S=5.8 (7.0 theory)

EXAMPLE 13

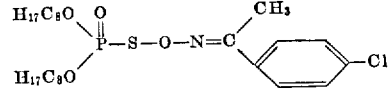

$N_D^{25}=1.4989$; percent P=5.2 (6.3 theory); percent S=6.2 (6.5 theory)

EXAMPLE 14

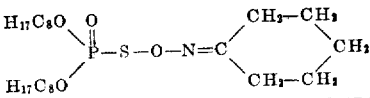

Percent P=6.4 (7.1 theory); percent S=6.8 (7.3 theory)

EXAMPLE 15

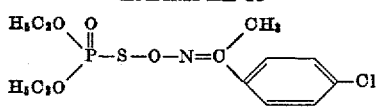

$N_D^{25} = 1.5322$; percent P=9.0 (9.2 theory); percent S=8.8 (9.5 theory); percent Cl=9.1 (10.5 theory)

EXAMPLE 16

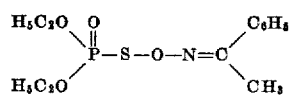

$N_D^{25} = 1.5136$; percent P=9.7 (10.2 theory); percent S=9.8 (10.5 theory)

EXAMPLE 17

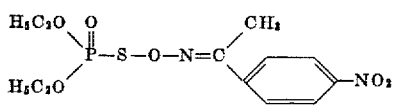

Percent P=9.8 (9.0 theory); percent S=9.7 (9.2 theory)

EXAMPLE 18

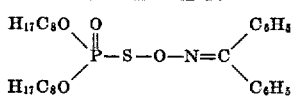

Percent P=5.2 (5.8 theory); percent S=6.6 (6.0 theory)

EXAMPLE 19

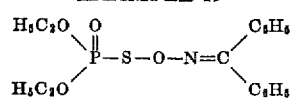

Percent P=9.6 (9.8 theory); percent S=10.1 (10.1 theory)

EXAMPLE 20

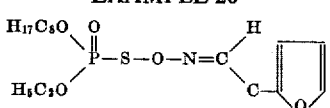

Yield=100%; percent P=8.9 (8.6 theory); percent S=7.9 (8.8 theory)

Pesticidal activity for the compounds of the foregoing examples is illustrated in Table I wherein the percentage kill among a group of test species is reported for a specified quantity of toxicant expressed in micrograms (herein termed the bioassay test) or for a percentage concentration of toxicant in aqueous solution (herein termed the screening test). A slanted line is used to separate the percentage kill among the test species, shown on the left, and the percentage concentration or total quantity of toxicant, shown on the right.

The following pest species were used in both screening and bioassay tests:

(1) House fly—*Musca domestica* (Linn.)
(2) American cockroach—*Periplaneta americana* (Linn.)
(3) Spotted milkweed bug—*Oncopeltus fasciatus* (Dallas)
(4) Confused flour beetle—*Tribolium confusum* (Duvol)
(5) Two-spotted mite—*Tetranychus telarius* (Linn.)
(6) Salt-marsh caterpillar—*Estigmene acrea* (Drury)

In the screening tests for species numbered 1 to 4 above, from ten to twenty-five insects were caked in cardboard mailing tubes 3⅛ inches in diameter and 2⅝ inches tall. The cages were supplied with cellophane bottoms and screened tops. Food and water were supplied to each cage, except in the case of the confused flour beetle which was primarily tested to determine fumigant action. Dispersions of the test compounds were prepared by dissolving one half gram of the toxic material in ten ml. of acetone. This solution was then diluted with water containing 0.015% Vatsol (a sulfonate-type wetting agent) and 0.005% methocel (methyl cellulose) as emulsifiers, the amount of water being sufficient to dilute the active ingredient to a concentration of 0.1% or below. The test insects were then sprayed with this solution. After twenty-four and seventy-two hours, counts were made to determine living and dead insects.

Compounds which showed high mortality of house flies in the screening test were bioassayed on *M. domestica*. In this test, a known quantity of the toxicant was placed in a confined area. For the fly bioassay, the same cages were employed as for the screening tests. A weighed amount of the toxicant was placed in a 60 mm. diameter petri dish along with 1 ml. of acetone containing light spray oil. After the solution air dried, a cage containing twenty-five female flies was placed over the residue. Counts of living and dead insects were made after twenty-four and seventy-two hours.

Essentially the same procedure was followed in the confused flour beetle bioassay as in the house fly bioassay. For this test, however, twenty adult beetles were used. Mortality was checked at twenty-four and forty-eight hours.

The miticidal screening test for species number 5 above involved using young pinto bean plants in the primary leaf stage as host plants for the mites. The bean plants were infested with several hundred mites and then sprayed to runoff with an aqueous test suspension prepared as described above. Sprayed plants were transferred to a greenhouse and held for fourteen days. The miticidal and ovicidal activity of the test compounds were determined after seven and fourteen days.

For lepidoptera evaluation the test organism used was the salt-marsh caterpillar, species number 6 above, a representative member of an order containing a large number of economically important plant pests. Test solutions of various concentrations were prepared by dissolving the active material in stock solutions of water containing wetting agents by the procedure outlined heretofore. Dock leaves approximately five inches long were dipped in these solutions for ten seconds. The leaves were then allowed to dry. A filter paper disk was placed in a one pound food container and moistened with one ml. of water. The dried dock leaves were then introduced into the container together with five third instar salt-marsh larvae. A petri dish cover was use for convenient observation. The tests were conducted for forty-eight hours. After twenty-four hours a fresh, undipped

*Table I*

| Example | House Fly | American Roach | Milkweek Bug | Confused Flour Beetle | Two-spotted Mite | Salt-marsh Caterpillar |
|---|---|---|---|---|---|---|
| 2 | 100/0.1% | | 100/0.1% | | | |
| 5 | 100/0.1% | | 50/0.1% | | | |
| 7 | 64/50µg | | | | 20/0.1% | |
| 8 | 100/0.1% | 20/0.1% | 100/0.1% | 90/50µg | 100/0.1% | |
| 15 | 100/50µg | 100/0.1% | 100/0.05% | 100/50µg | 100/0.12% | 10/0.1% |
| 16 | 64/50µg | 40/0.1% | 100/0.05% | 10/0.1% | 99/0.12% | 20/0.1% |
| 17 | 96/50µg | 100/0.1% | 100/0.1% | 100/50µg | | 60/0.1% | dock leaf was placed in the container. Mortality readings were taken at twenty-four and forty-eight hours.

The compounds of the present invention were also tested for herbicidal activity on some economically important plant species. The data obtained from such tests are reported in Table II wherein "+" is slight injury, "++" is moderate injury, and "+++" is severe injury to plant life. The following reference characters are used in Table II to represent the indicated plant species:

B—bind weed  
C—crab grass  
D—dock  
F—foxtail  
G—pigweed  
M—mustard  
O—oats  
P—pinto bean  
R—radish  
W—watergrass

Table III

| Example | Rust | | | Mildew | | |
|---------|------|------|------|--------|------|------|
|  | 1,000 p.p.m. | 500 p.p.m. | 100 p.p.m. | 1,000 p.p.m. | 500 p.p.m. | 100 p.p.m. |
| 6 |  |  |  | +++ | + |  |
| 10 | ++ | + |  | ++++ |  |  |
| 11 | +++ | + |  | + |  |  |
| 12 | +++ | ++ |  |  |  |  |
| 15 | ++ |  |  | + |  |  |
| 16 |  |  |  | ++ |  |  |

Although specific examples show the use of aqueous solutions of the toxic compounds as insecticides, fungi-

Table II

| Example | Mode of Application | B | C | D | F | G | M | O | P | R | W |
|---------|---------------------|---|---|---|---|---|---|---|---|---|---|
| 2 | Post-emergence |  | + |  | + |  |  |  | + D. |  |  |
| 3 | do |  | + |  |  |  | + |  | +++ |  |  |
| 4 | do | + | + |  |  | Ge. +++ |  | + | ++ |  |  |
| 5 | do |  | + | ++ |  | +++ | + |  |  |  | + |
| 5 | do |  |  |  |  |  |  | + |  |  |  |
| 8 | do |  | + | + |  | ++ | + |  | ++ | + |  |
| 8 | do | + |  |  | ++ |  |  |  |  |  |  |
| 10 | do |  |  |  |  | + | + |  | S.I. +++ |  |  |
| 10 | do | + |  |  |  |  |  |  | +++ + | ++ | + |
| 15 | do |  |  |  |  |  | + |  |  |  | + |

Ge. represents germination.  
D. represents defoliation.  
S.I. represents shortened intermode.

To more specifically define the type of plant injury observed, the abbreviations S.I., D., and Ge. are shown in Table II. The abbreviations are used only when outstanding activity is observed.

Pre-emergence herbicidal tests were conducted following planting, but prior to emergence of the plants, usually the day following planting. The active compounds were applied at a concentration of 20 pounds of active material, diluted in water to a volume of 80 gallons, for each acre treated. The aqueous herbicidal solution was simply sprayed on the pre-planted soil. After fourteen days the plants were inspected and compared with an untreated control group planted on the same day. The usual plant species employed in this test were crab grass, foxtail, watergrass, wild oats, pigweed, mustard, and dock.

Post-emergence herbicidal tests were initiated approximately two weeks following emergence of the test plants. The method of application involved spraying on the plant foliage a 0.2% aqueous solution of the active compound to the point of run-off. The concentration of active material when spraying this solution was approximately 25 pounds per planted acre. The usual plant species employed in post-emergence herbicidal testing were annual bluegrass, foxtail, mustard, wild oats, and pinto bean. Evaluation of herbicidal activity was accomplished after fourteen to nineteen days.

The compounds of the invention were also tested for fungitoxicity. Pinto bean plants were sprayed at 1000, 500, and 100 parts per million concentration of test compound dissolved or suspended in water and wetting agent (Tween 20). After drying, the beans were inoculated with bean rust or powdery mildew spores. Rust infection required an overnight treatment in a mist chamber after inoculation. The fungicidal test procedure was designed to indicate protectant action, as well as eradicant and leaf systemic action. Activity demonstrated by the compounds of the invention is set forth in Table III wherein ++++, +++, ++, and + indicate 75–100%, 50–75%, 25–50%, and 0–25% control, respectively.

cides, and herbicides, they may also be used in the form of emulsions, non-aqueous solutions, wettable powders, vapors, and dusts as may be best suited to the conditions of use. For more specialized applications, the toxic material may even be used in a pure, undiluted form.

The term "pest" is used herein in the restricted sense generally recognized in the art as applying to the lower forms of life customarily controlled by chemical means and excluding the higher animals, the vertebrates, e.g., rodents, birds, and larger forms, which are more commonly controlled by mechanical means such as traps. In its broadest usage, the term refers to both the destructive or annoying household or plant pest organisms, especially the parasites and pathogens. It will be apparent to one skilled in the art that the toxic activity demonstrated on the selected arthropods, arachnids, fungi, and lepidopterous larvae is indicative of toxic activity in various species and orders not specifically shown.

The foregoing description is given for clearness of understanding only and no unnecessary limitations should be understood therefrom, as modifications will be obvious to those skilled in the art.

What we claim is:

1. As a new composition of matter, a compound having the formula:

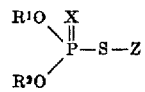

wherein $R^1$ and $R^2$ are alkyl, X is selected from the group consisting of sulfur and oxygen, and Z is a member selected from the group consisting of oximino radicals of the formula

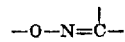

in which the oxygen is linked to the thio sulfur in the phosphoro ester portion of the molecule and the two available bonds of the carbon are substituted with members selected from the group consisting of hydrogen, alkyl, aryl, alkaryl, aralkyl, alkoxyalkyl, alkoxyaryl, cycloalkyl and phosphoro ester radicals of the formua:

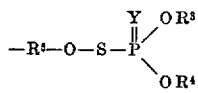

in which $R^3$ and $R^4$ are alkyl radicals, Y is selected from the group consisting of oxygen and sulfur, and $R^5$ is selected from the group consisting of lower alkylene, phenylene, and naphthalene and oxamino radicals of the formula —O—NH—C(O)— in which the oxygen having the available bond is linked to the thio sulfur in the phosphoro ester portion of the molecule and the available bond of the carbon is substituted with a member selected from the group consisting of hydrogen, alkyl, aryl, alkaryl, aralkyl, alkoxyalkyl and alkoxyaryl.

2. As a new composition of matter: O-(O,O-diethylphosphorothio)-cyclohexanone oxime.

3. As a new composition of matter: O-(O,O-diethylphosphorothio)-2,4-dimethylphenyl methyl ketoxime.

4. As a new composition of matter: O-(O-ethyl-O-octylphosphorothio)-furfuraldoxime.

5. As a new composition of matter: O-(O,O-diethylphosphorothio)-benzenehydroxamate.

6. A method of controlling pests which comprises contacting the pests with a pesticidal amount of at least one compound having the formula:

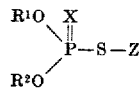

wherein $R^1$ and $R^2$ are alkyl, X is selected from the group consisting of sulfur and oxygen, and Z is a member selected from the group consisting of oximino radicals of the formula

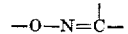

in which the oxygen is linked to the thio sulfur in the phosphoro ester portion of the molecule and the two available bonds of the carbon are substituted with members selected from the group consisting of hydrogen, alkyl, aryl, alkaryl, aralkyl, alkoxyalkyl, alkoxyaryl, cycloalkyl and phosphoro ester radicals of the formula:

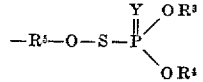

in which $R^3$ and $R^4$ are alkyl radicals, Y is selected from the group consisting of oxygen and sulfur, and $R^5$ is selected from the group consisting of lower alkylene, phenylene, and naphthalene and oxamino radicals of the formula —O—NH—C(O)— in which the oxygen having the available bond is linked to the thio sulfur in the phosphoro ester portion of the molecule and the available bond of the carbon is substituted with a member selected from the group consisting of hydrogen, alkyl, aryl, alkaryl, aralkyl, alkoxyalkyl and alkoxyaryl.

7. The method of controlling pests which comprises contacting the pests with a pesticidal amount of O-(O,O-dimethylphosphorodithio)-cyclohexanone oxime.

8. The method of controlling pests which comprises contacting the pests with a pesticidal amount of O-(O,O-diethylphosphorothio)-p-chlorophenyl methyl ketoxime.

9. The method of controlling pests which comprises contacting the pests with a pesticidal amount of O-(O,O-diethylphosphorothio)-acetophenone oxime.

10. The method of controlling pests which comprises contacting the pests with a pesticidal amount of O-(O,O-dioctylphosphorothio)-benzophenone oxime.

11. A method of controlling undesired plants which comprises contacting the plants with at least one compound having the formula:

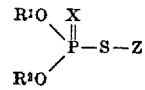

wherein $R^1$ and $R^2$ are alkyl, X is selected from the group consisting of sulfur and oxygen, and Z is a member selected from the group consisting of oximino radicals of the formula

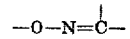

in which the oxygen is linked to the thio sulfur in the phosphoro ester portion of the molecule and the two available bonds of the carbon are substituted with members selected from the group consisting of hydrogen, alkyl, aryl, alkaryl, aralkyl, alkoxyalkyl, alkoxyaryl, cycloalkyl and phosphoro ester radicals of the formula:

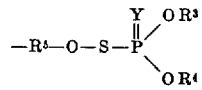

in which $R^3$ and $R^4$ are alkyl radicals, Y is selected from the group consisting of oxygen and sulfur, and $R^5$ is selected from the group consisting of lower alkylene, phenylene, and naphthalene and oxamino radicals of the formula —O—NH—C(O)— in which the oxygen having the available bond is linked to the thio sulfur in the phosphoro ester portion of the molecule and the available bond of the carbon is substituted with a member selected from the group consisting of hydrogen, alkyl, aryl, alkaryl, aralkyl, alkoxyalkyl and alkoxyaryl.

12. The method of controlling undesired plants which comprises contacting the plants with O-(O,O-diethylphosphorothio)-benzenehydroxamate.

13. The method of controlling undesired plants which comprises contacting the plants with O-(O,O-dimethylphosphorothio)-acetophenone oxime.

14. The method of controlling undesired plants which comprises contacting the plants with O,O'-bis(diethylphosphorothio-p-hydroxybenzaldoxime.

15. The method of controlling undesired plants which comprises contacting the plants with O-[O-(2-ethylhexyl)-O-ethylphosphorothio]-acetophenone oxime.

16. A method of preparing a componnd having the formula:

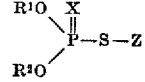

wherein $R^1$ and $R^2$ are alkyl, X is selected from the group consisting of sulfur and oxygen, and Z is a member selected from the group consisting of oximino radicals of the formula

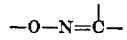

in which the oxygen is linked to the thio sulfur in the phosphoro ester portion of the molecule and the two available bonds of the carbon are substituted with members selected from the group consisting of hydrogen, alkyl, aryl, alkaryl, aralkyl, alkoxyalkyl, alkoxyaryl, cycloalkyl and phosphoro ester radicals of the formula:

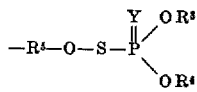

in which $R^3$ and $R^4$ are alkyl radicals, Y is selected from the group consisting of oxygen and sulfur, and $R^5$ is selected from the group consisting of lower alkylene, phenylene, and naphthalene and oxamino radicals of the formula —O—NH—C(O)— in which the oxygen having the available bond is linked to the thio sulfur in the phosphoro ester portion of the molecule and the available bond of the carbon is substituted with a member selected from the group consisting of hydrogen, alkyl, aryl, alkaryl, aralkyl, alkoxyalkyl and alkoxyaryl which comprises reacting an O,O-dialkylphosphorosulfenyl halide with a substantially stoichiometric amount of a compound selected from the group consisting of oximes and hydroxamic acids at a temperature within the range of from about $-100°$ C. to about $100°$ C. in the presence of a hydrogen halide acceptor.

17. The method set forth in claim 16 wherein the reaction is accomplished in the presence of a non-aqueous organic solvent.

References Cited in the file of this patent

UNITED STATES PATENTS

| | | |
|---|---|---|
| 2,957,016 | Diamond | Oct. 18, 1960 |
| 2,995,568 | Malz | Aug. 8, 1961 |
| 3,018,215 | Pianka | Jan. 13, 1962 |

UNITED STATES PATENT OFFICE
CERTIFICATE OF CORRECTION

Patent No. 3,094,406            June 18, 1963

Glenn R. Price et al.

It is hereby certified that error appears in the above numbered patent requiring correction and that the said Letters Patent should read as corrected below.

Column 2, line 6, after "dimethylphosphorothio" insert a a closing parenthesis; column 4, EXAMPLE 8, for that portion of the formula reading column 5, Table I, fourth column heading, for "Milkweek Bug" read -- Milkweed Bug --; column 6, line 4, for "caked" read -- caged --; column 10, line 46, for "componnd" read -- compound --.

Signed and sealed this 24th day of December 1963.

(SEAL)
Attest:

ERNEST W. SWIDER

Attesting Officer

EDWIN L. REYNOLDS

Acting Commissioner of Patents